March 4, 1924.

P. M. FOWL ET AL 1,485,383

MACHINE LATHE

Filed March 26, 1919

Inventors.
Percy M. Fowl.
Herman W. Zimmerman.
Emery, Booth, Janney & Varney. Attys.

March 4, 1924.

P. M. FOWL ET AL 1,485,383

MACHINE LATHE

Filed March 26, 1919

P. M. FOWL ET AL
MACHINE LATHE
Filed March 26, 1919  7 Sheets-Sheet 4

Inventors.
Percy M. Fowl.
Herman W. Zimmerman.
Emery, Booth, Janney & Varney, Attys.

March 4, 1924.
P. M. FOWL ET AL
MACHINE LATHE
Filed March 26, 1919
1,485,383
7 Sheets-Sheet 5
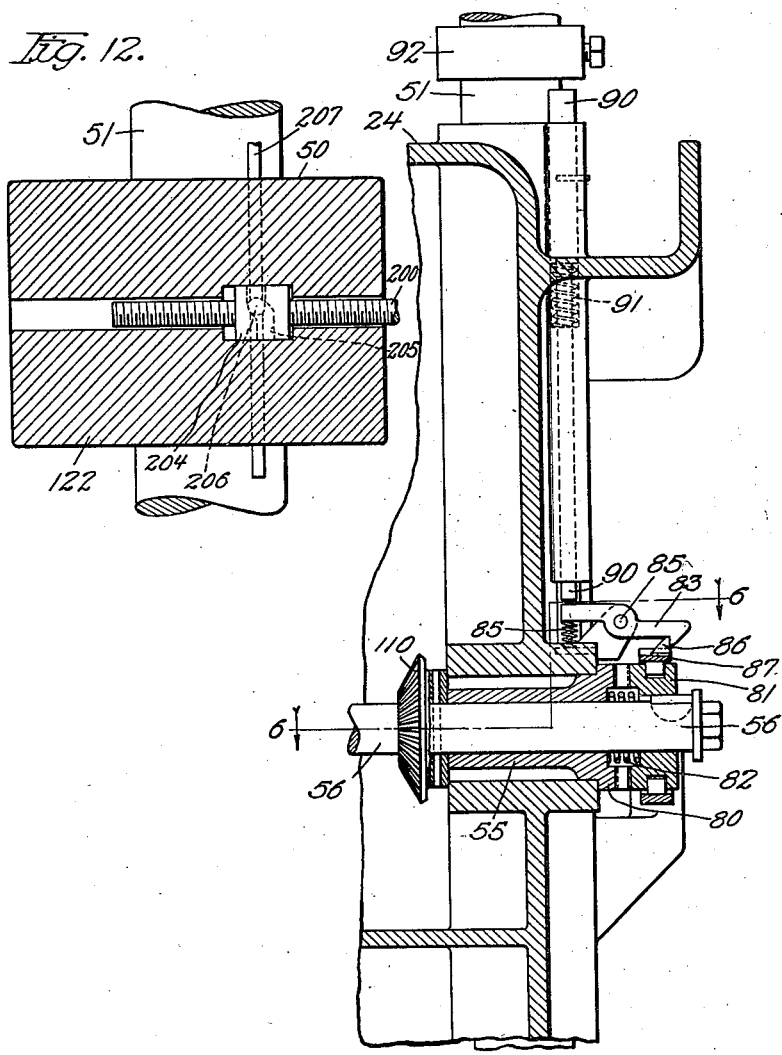
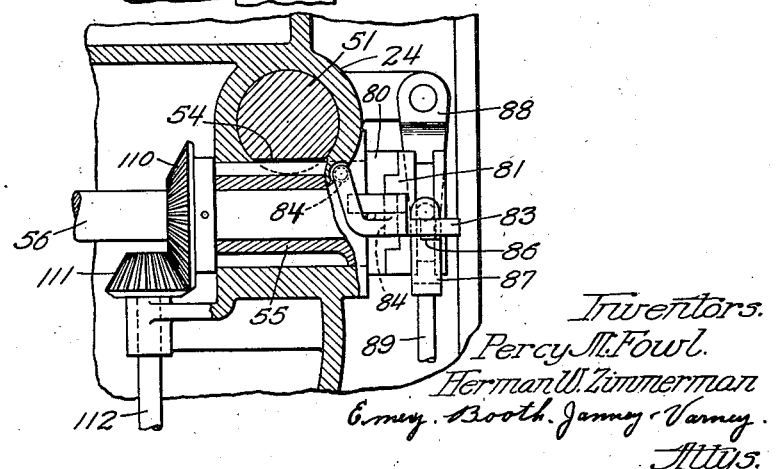
Inventors.
Percy M. Fowl.
Herman W. Zimmerman
Emery, Booth, Janney & Varney.
Attys.

Inventors
Percy M. Fowl.
Herman W. Zimmerman.
Emery, Booth, Janney & Varney
Attys.

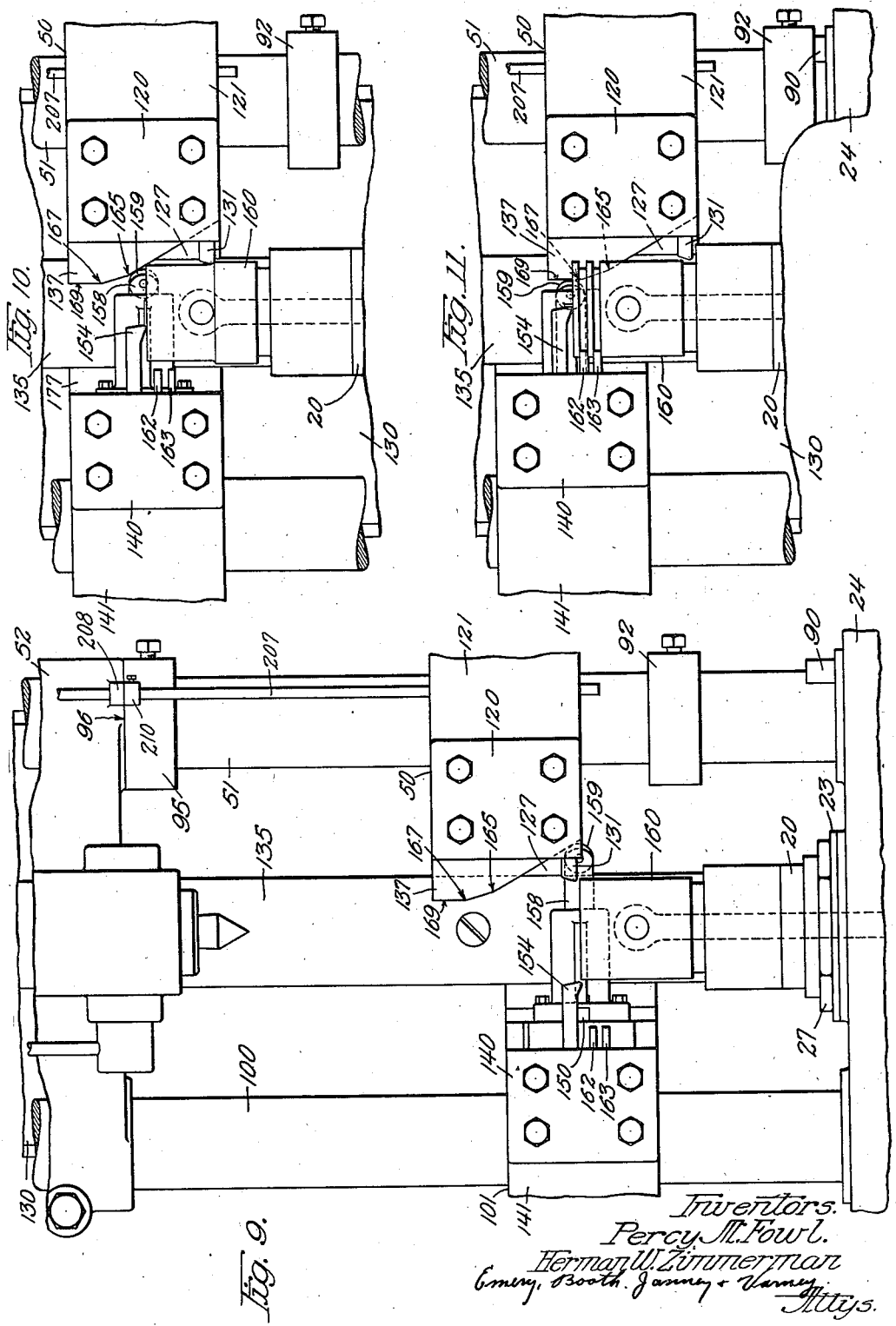

Patented Mar. 4, 1924.

1,485,383

UNITED STATES PATENT OFFICE.

PERCY M. FOWL AND HERMAN W. ZIMMERMAN, OF DETROIT, MICHIGAN; UNION TRUST COMPANY, EXECUTOR OF SAID PERCY M. FOWL, DECEASED, ASSIGNORS, BY DIRECT AND MESNE ASSIGNMENTS, TO CADILLAC MACHINERY COMPANY, OF DETROIT, MICHIGAN, A CORPORATION OF MICHIGAN.

MACHINE LATHE.

Application filed March 26, 1919. Serial No. 285,218.

*To all whom it may concern:*

Be it known that we, PERCY M. FOWL and HERMAN W. ZIMMERMAN, citizens of the United States, and residents of Detroit, in the county of Wayne and State of Michigan, have invented an Improvement in Machine Lathes, of which the following is a specification.

This invention relates to machine lathes; more particularly to a novel construction and organization of lathe in which various advantages are procured as hereinafter described.

Among other objects, the invention is intended to provide a lathe of maximum accuracy and durability by reason of reduction in friction and wear; and to provide for convenience in adjustment and operation and for highly accurate and sensitive operation at high speeds and under automatic control to such extent as may be desired. Other objects of the invention will appear to those skilled in the art from the following description.

In the drawings:

Fig. 5 is a detail vertical section on the line 5—5 of Fig. 2.

Fig. 6 is a detail horizontal section on the line 6—6 of Fig. 5.

Fig. 9 is an enlarged detail front elevation of the tool carriers showing them in one cooperative relationship.

Figs. 10 and 11 are views similar to Fig. 9, showing the parts in successive cooperative relationships.

Fig. 12 is a detailed vertical section on a line 12—12 of Fig. 8.

Figure 1:
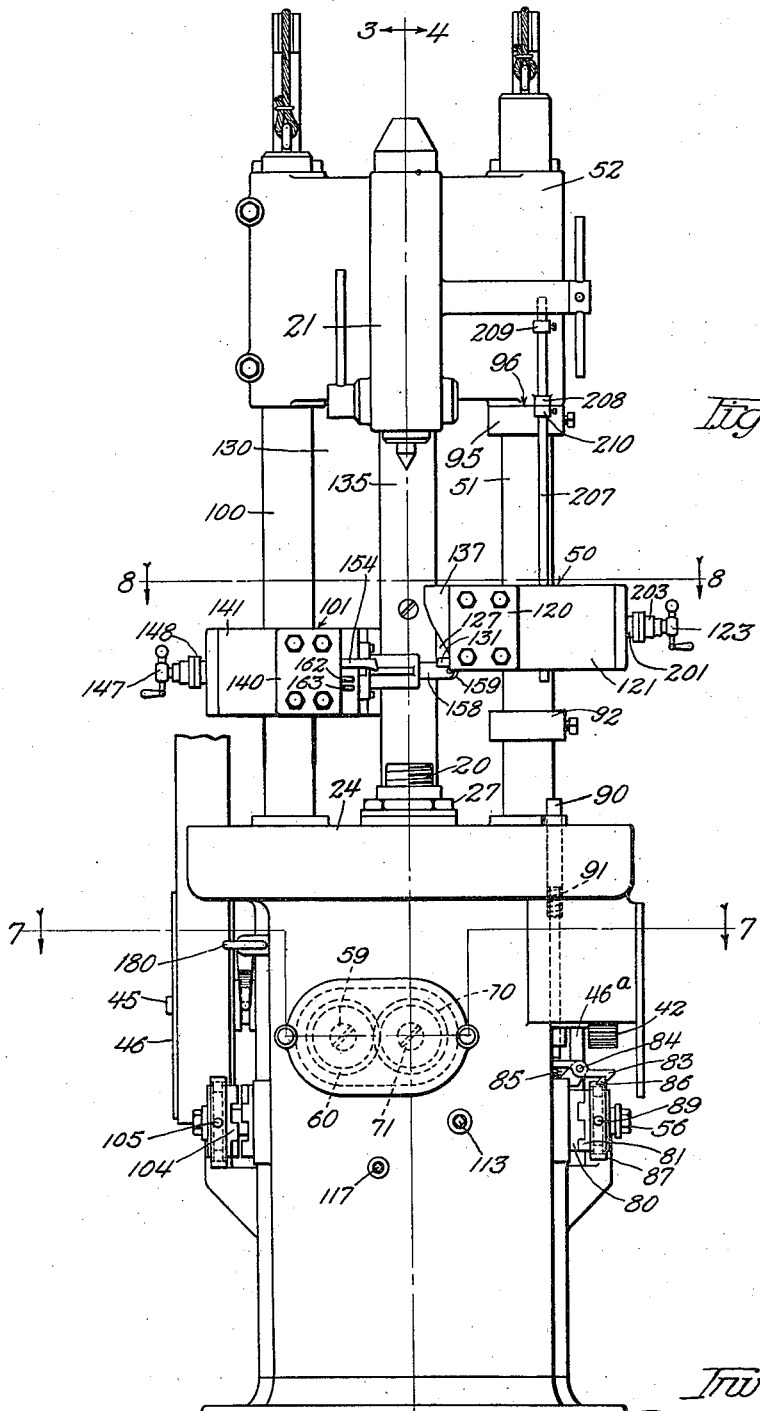
Fig. 1 is a front elevation of the machine.

Referring to the drawings, the illustrative construction comprises the lathe spindle 20 disposed upon a vertical axis, and a tailstock 21 of any suitable construction which may be employed or not as desired.

The manner in which the spindle 20 is mounted exemplifies an important phase of the invention.

Figure 4:
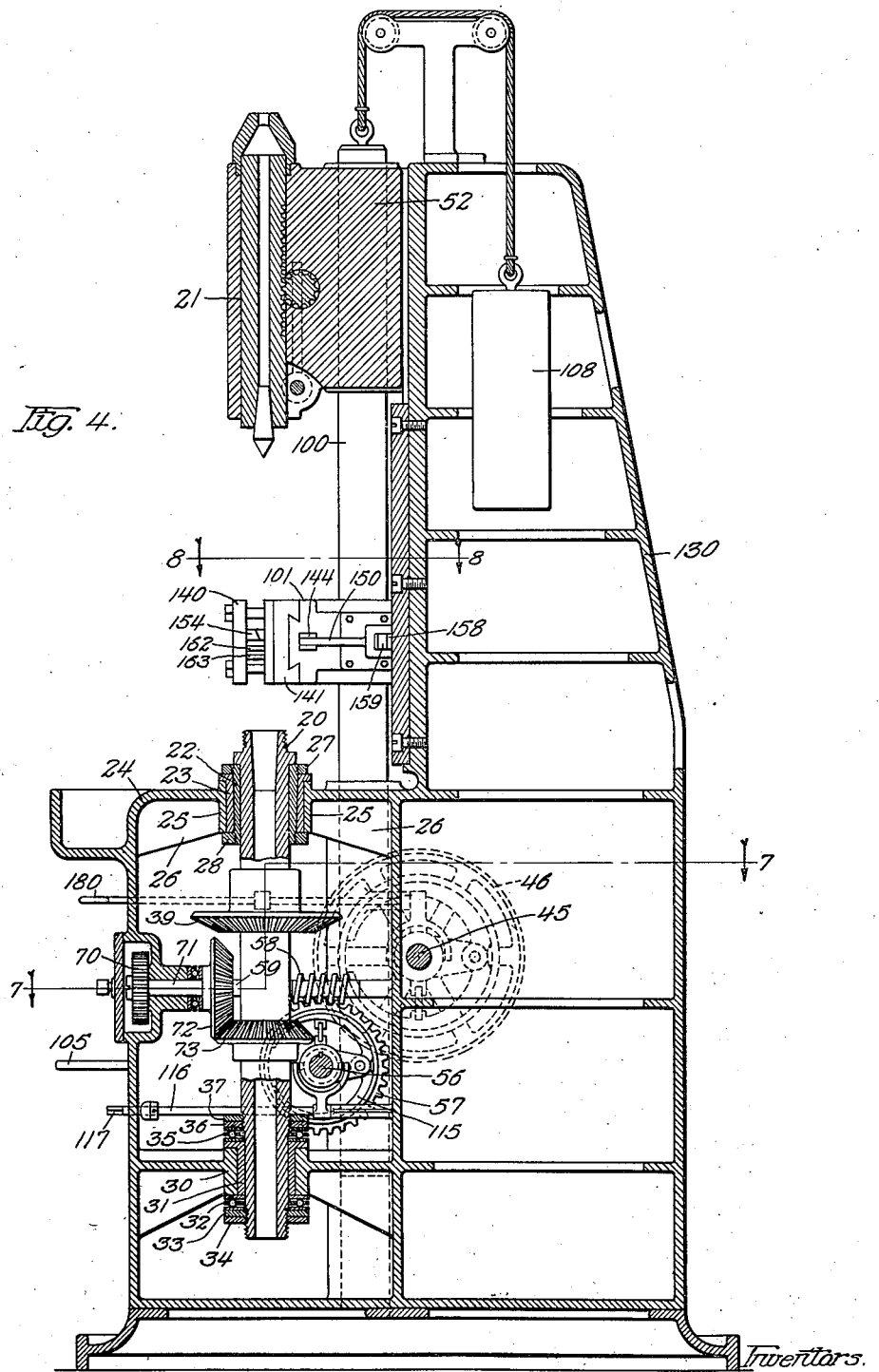
Fig. 4 is a vertical section on the line 3—4, 3—4, of Fig. 1, viewed from right to left in Fig. 1.

As shown on an enlarged scale in Fig. 4 the bearing for the upper end of the spindle 20 comprises a bushing 22 and a sleeve 23, the latter mounted upon the frame casting 24 of the machine preferably by fitting in a cylindrical seat in said casting as indicated at 25, the walls of said seat being braced by webs 26 of the frame casting. The convex outer surface of the sleeve 23 is preferably cylindrical, while its inner concave surface is of inverted cone shape. The outer face of the bushing 22 is preferably correspondingly conical and the bushing is split wholly or partially so as to permit its interior diameter to be contracted when the bushing is forced downwardly in its frusto conical support in the sleeve 23. The upper extremity of the bushing may be threaded for a nut 27 and its lower extremity may be threaded for a nut 28.

The bearing for the lower extremity of the spindle comprises the webbed casting 30 supporting a sleeve or bushing 31 in which the spindle 30 turns. Beneath the casting 30 is a ball bearing 32 and a pair of nuts 33 and 34 threaded upon the spindle, the nut 34 serving as a lock nut. The ball bearing 32 may comprise opposed washers and a ball retainer as shown. Above the casting 30 is a ball bearing 35 and a pair of nuts 36, 37 threaded on the spindle the nut 37 serving as a lock nut.

The spindle 20 is rotated in its bearings by mechanism hereinafter described. During this rotation the weight of the heavy spindle, the weight of the work carried thereby, and the end thrust of the work caused by the cutting tool, are all sustained by the ball bearing 35 which is of course durable and wears evenly with no effect except a tendency to lower the spindle slightly in a vertical direction. That tendency may be compensated and the wear readily taken up by adjusting the nuts 33, 34 and 36, 37 so that the entire wear resulting from the weight and end thrust of the heavy spindle and work may be rendered negligible.

An important consideration is this:

The effect of gravity and end thrust on the spindle and work produces wear only in a plane perpendicular to the axis of rotation of the spindle, and does not tend in any degree to wear the spindle or its bearings unsymmetrically so as to displace its axis of rotation or to loosen the bearings or to change the relationship of the tool carriers and the axis of rotation of the work. These circumstances contribute an important character of dependable and durable accuracy of operation.

It is preferred to employ two tools or two sets of tools acting upon opposite sides of the work rotated by the spindle 20, and when so arranged the working thrusts of the respective tools or sets of tools tend to compensate. Hence the tendency to wear the upper bearing of the spindle 20 in an unsymmetrical manner is minimized. To such an extent as it may be necessary to compensate for wear of the upper bearing, the split or partially split bushing 22 may be forced downwardly in its conical seat so that its inner surface shall be symmetrically contracted.

With the described arrangement the end thrust on the spindle 20 and also the weight of the spindle and the work, are taken up by the same ball bearing 35 which wears symmetrically and is readily adjustable to compensate for wear. The relatively slight tendency to wear in a horizontal direction at the upper bearing of the spindle, may be taken up by adjusting the bushing 22. Obviously this organization insures the rotation of the spindle and work on a fixed axis at all times and contributes a reliable and permanent accuracy of operation.

Figure 2:
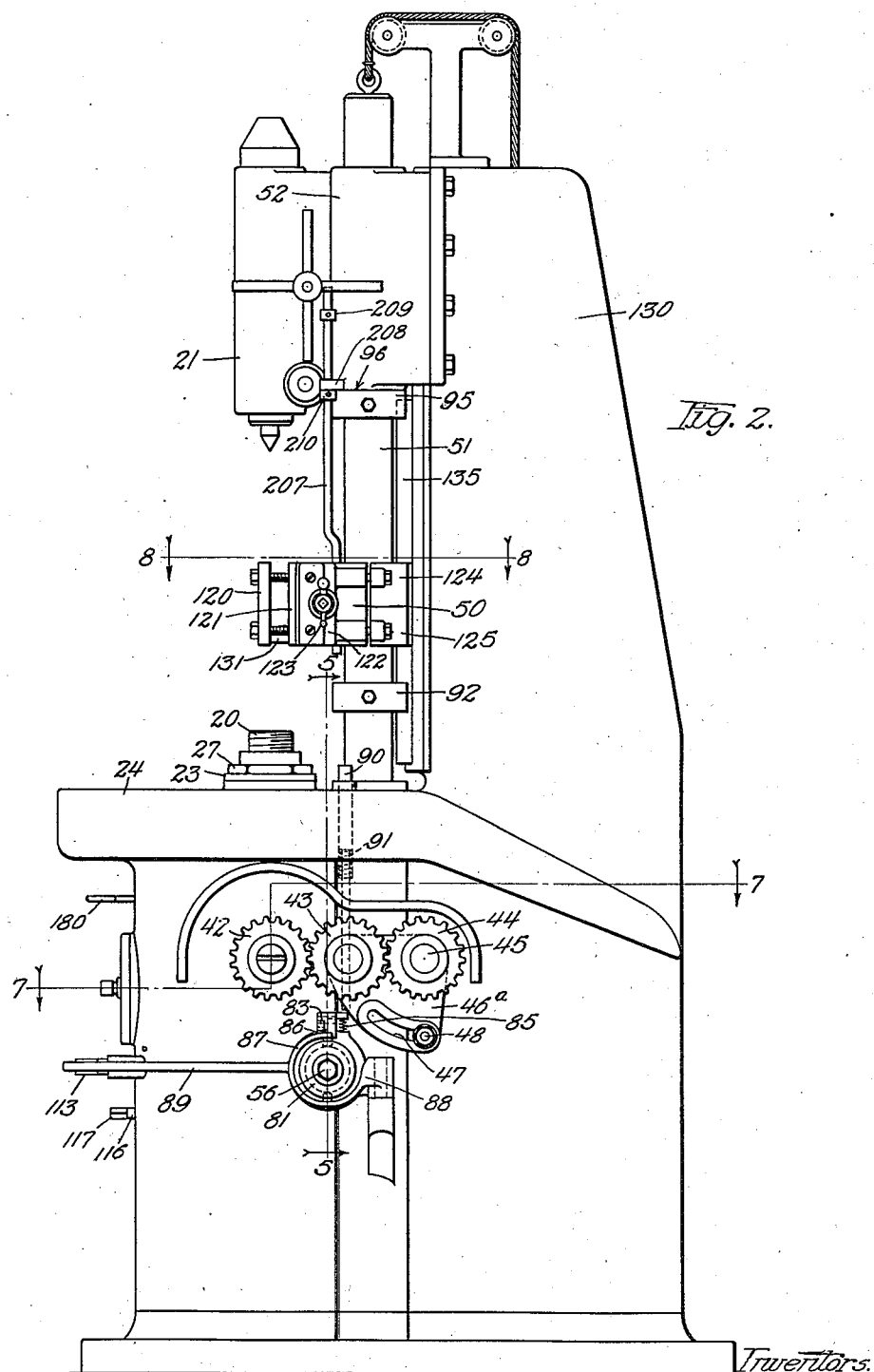
Fig. 2 is a side elevation viewed from the right of Fig. 1.

The spindle 20 is rotated through a bevel gear 39, fixed on the spindle, which is driven by a bevel gear 40 fixed on a shaft 41 which is mounted in bearings in the frame casting. On the outer end of the shaft 41 is a gear 42 shown in side elevation in Fig. 2. The gear 42 meshes with an idle intermediate gear 43 driven by a gear 44 mounted on the main shaft 45 which at its opposite end from the gear 44 carries the belt pulley 46.

The idle gear 43 is mounted on a stub carried in a sector 46ª projecting from a hub rotatably mounted on the shaft 45. The sector 46ª has a slot 47 traversed by a clamping bolt 48 in the frame, by which the sector 46ª may be clamped in any desired adjusted position. The gear 42 is made readily removable from its shaft 41 so that it may be replaced by a gear of different size, the described arrangement of the sector 46 and gear 43 being such that the latter may be adjusted in proper position to mesh with whatever desired size of gear is placed on the shaft 41. This arrangement admits of a change in the operating speed of the shaft 41 and spindle 20, by the very simple expedient of changing the gear 42 and adjusting the gear 43 to suit the diameter of the newly inserted gear.

The gears 42, 43 and 44 may be enclosed in a housing as indicated in Fig. 1.

Thus the vertically disposed spindle may be driven at a selected speed and its rotation will be maintained effectually on a constant axis without material tendency to deviate from that axis by reason of gravity or other wear-inducing influence.

Referring to Figs. 1, and 9 provision is made for a tool at one side of the work to travel in a direction parallel to the axis of rotation of the work; while a tool at the opposite side moves in a direction transverse to the axis of rotation of the work; or if preferred both tools may be moved parallel to said axis.

A tool carrier 50 is shown as mounted upon a heavy vertically movable carriage shown as a bar 51, cylindrical in cross-section and mounted in extensive bearings in the upper frame casting 52 and also in extensive bearings in the lower frame casting. The tool carrying bar 51 is vertically movable in its bearings and, being vertically disposed, it has no tendency to wear its bearings unsymmetrically by reason of gravity. The extensive area of its bearings renders its accurate alignment extremely durable against the comparatively slight wearing tendencies caused by the transverse thrust of the tool or tools mounted thereon.

Thus the respective mountings of the spindle 20 and tool carrying bar 51, according to this invention, insure, with great durability, a substantially perfect and permanent relative alignment of the axis of rotation of the work and the axis of movement of the tool carrier, the tendency of gravity to disturb that alignment being negligible and therefore permitting the various parts to be made as large and heavy as desired for stability and accuracy without correspondingly increasing wear.

Figure 3:
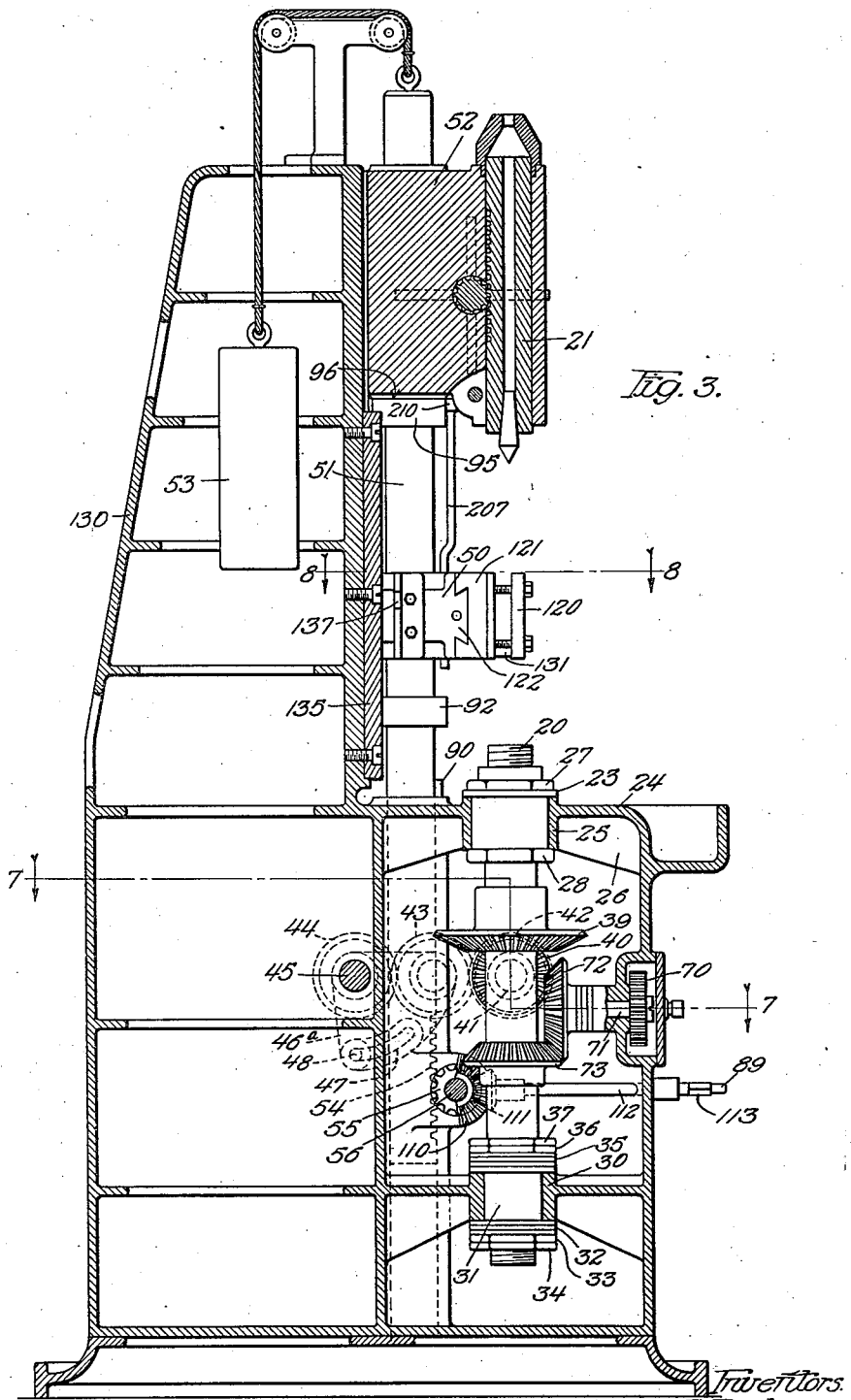
Fig. 3 is a vertical section on the line 3—4, 3—4, of Fig. 1, looking from left to right in Fig. 1.

In the illustrative machine the tool carrying bar 51 is fed downwardly by power during the cutting operation of its tool or tools, and after completion of a cutting operation, the bar 51 is returned upwardly to its starting point by means of a counter weight 53 shown in Fig. 3.

For the purpose of feeding the bar 51 downwardly its lower end (Fig. 3.) has formed thereon a rack 54 engaged by a pinion 55 mounted on a shaft 56 to which is fixed a worm gear 57 (Fig. 4.) driven by a worm 58 on a shaft 59 mounted in the frame casting and having at its outer end a gear 60 meshing with the gear 70 on a shaft 71 having at its inner end a bevel gear 72 which meshes with a bevel gear 73 fixed upon the lathe spindle 20. Thus the rotation of the spindle 20 and its bevel gear 73 drives the gear 72, shaft 71, gear 70, gear 60, shaft 59, worm 58, worm gear 57 and therethrough the shaft 56 and pinion 55 which meshes with the feeding rack of the tool carrying bar 51.

Referring now to Figs. 5 and 6, the pinion 55 is loose on the shaft 56 but is arranged to be clutched to and unclutched from said shaft at desired times. The outer end of the pinion 55 forms one member 80 of a crown clutch, the other member 81 being slidably keyed to the shaft 56 as shown in Fig. 5. A spring 82, interposed between the pinion 55 and the clutch 81 tends to hold the two out of clutch and render the pinion merely idle on the shaft 56, in which case the bar 51 is permitted free vertical movement and may be lifted by the counter weight 50. When desired however, the clutch member 81 is thrown into clutch with the teeth on the outer end of the pinion 55, and is held in that position by means of a latch 83 pivoted at 84 on the frame, and pressed by a spring 85 into latching engagement with a lug 86 on a yoke 87 having rollers which engage an annular groove in the clutch member 81. The yoke 87 has an extension 88 pivoted on a vertical axis to the frame, and has another extension supplying a hand operated shipping lever 89. By throwing the shipping lever 89 toward the left in Fig. 1, the yoke 87 is rocked toward the left in Fig. 5 so as to compress the spring 82, throw the clutch member 81 into clutch with the pinion 55, and at the same time latch the lug 86 beneath the spring pressed latch 83 which holds the parts in clutch. When thus clutched the drive of the machine described above causes the pinion 55 to feed the tool carrying bar 51 downwardly at whatever speed is determined by the gearing interposed between the driving bevel gear 73, fixed on the spindle 20, and the shaft 56. The speed of feeding movement of the tool carrying bar 51 may be changed by removing the gears 60 and 70 and replacing them by two gears of a different ratio. The gears 60 and 70 are made readily removable to suit this purpose.

In order to provide for returning the tool carrying bar 51 upwardly after it has completed a downward cutting operation, provision is made for automatically unclutching the feeding pinion 55 from the clutch member 81 when the bar 51 has reached a desired predetermined point in its downward movement. For this purpose means is provided for disengaging the latch 83 from the lug 86 to permit the spring 82 to throw the member 81 out of clutch. The latch 83 is so disengaged by means of a plunger 90 mounted to slide vertically in the frame of the machine and normally upheld by a spring 91. The upper end of the plunger 90 stands in the path of a collar 92 adjustably fixed on the tool carrying bar 51. The collar is adjusted on the bar 51 in such a position that it will contact with the upper end of the plunger 90, drive it downwardly and unship the latch 83 at exactly the desired termination of the downward feeding movement of the bar 51; and when the latch 83 is unshipped, the clutch member 81 is immediately thrown out of clutch by the spring 82, the pinion 55 is thereupon rendered idle upon the shaft 56 and the bar 51 is permitted to be drawn upwardly by its counter weight, until a stop collar 95 adjustably fixed on the bar 51 contacts with a stop face 96 on the frame casting 52 and thereby arrests the bar 51 against further upward movement. Thus the adjustable collars 92 and 96 determine adjustably, the two limits of vertical travel of the bar 51. When the bar has been returned to the uppermost limit of its movement, the clutch 81 will remain out of clutch until thrown in again by manipulation of the hand-shipping lever 89, but when the shipping lever is thrown in, the downward feed of the bar 51 will recommence.

In the illustrative machine a second tool carrying bar 100 is provided; it is vertically disposed in extensive bearings at its upper end in the frame casing 52 and at its lower end in the lower part of the frame. The bar 100 carries a tool carrier 101.

Figure 7:
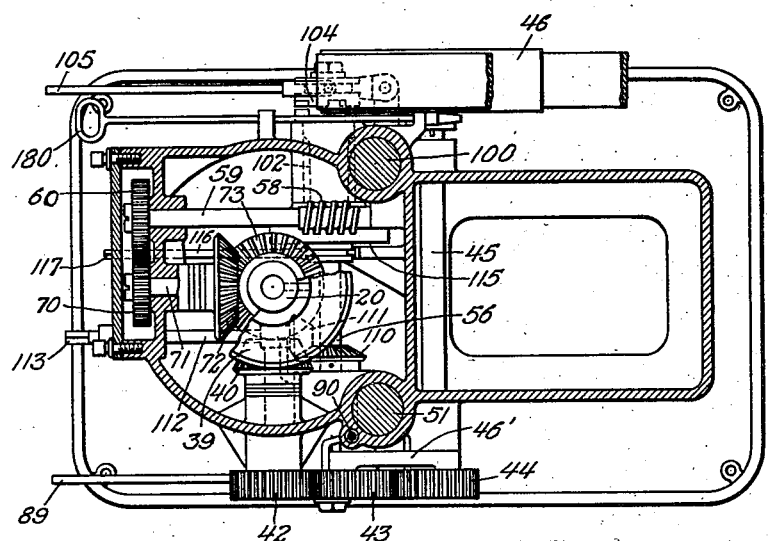
Fig. 7 is a horizontal section on the plane indicated by the lines 7—7 in Figs. 1, 2, 3 and 4.

The lower end of the bar 100 may be given the form of a rack to cooperate with a pinion 102 (Fig. 7) mounted loosely on the shaft 56, and arranged to be clutched thereto and unclutched therefrom by a clutching mechanism like that already described in connection with pinion 55 for the tool carrying bar 51. This clutch mechanism (Fig. 1) may comprise a clutch member 104 arranged to be operated by a hand shipping lever 105. Ordinarily in the use of this specific machine the clutch member 104 and the pinion 102 will be used only for adjusting the bar 100 downwardly and therefore the clutch member 104 may be held out of clutching engagement by a spring (not shown) like the spring 82 of the other clutch; and the clutch member 104 may be held in engagement by means of the shipping lever 105, when it is desired to move the bar 100 downwardly. The bar 100 may be moved upwardly by a counter-weight 108 shown in Fig. 4.

Obviously if desired the automatic reversing mechanism comprising the latch 83, the plunger 90, and collar 92 may be duplicated in connection with the bar 100 and the clutch member 104 to provide for automatically reversing the movement of the bar 100.

From the foregoing it will be apparent that the machine provides means for moving either or both of the tool carrying bars 51 and 100 upwardly or downwardly, whether for producing cutting feed of a tool or tools, or for purposes of adjustment, these means being illustrated by the counter-weights for moving the respective bars upwardly and the driven shaft 56 to which either or both of the bars 51 and 100 may be coupled for moving them downwardly. In addition to those means for moving the bars, it is desirable to provide an additional hand adjustment and for this purpose (see Figs. 5 and 7) a bevel gear 110 is fixed on the shaft 56 and meshes with a bevel gear 111 (see Fig. 7) fixed upon a shaft 112 mounted in the frame of the machine and extending to the exterior thereof where the end of the shaft is squared at 113 to receive a handle or wrench.

When it is desired to use the hand adjustment just described, the shaft 56 must be freed from the effect of the worm gear 57 and worm 58 which would otherwise prevent rotation of the shaft 56 by the hand operation of the shaft 112. For this purpose a clutch 115 is provided (see Fig. 4) between the shaft 56 and worm gear 57; this may be an expansion clutch operated by the shaft 116 having the squared end 117 to receive a wrench or handle. By these means the shaft 56 may be unclutched from the worm gear 57 when it is desired to adjust by hand one or both the bars 51 and 100; and the shaft 56 and worm gear 57 may be clutched for rotating the shaft 56 by power. As already described, either the bar 51 or the bar 100 or both may be coupled up with the shaft 56, either for the hand or the power operation.

To suit the particular character of the tool carriers, and for the novel cooperation about to be described, it is assumed that in the use of the illustrative machine, the bar 100 remains stationary (except for vertical adustment) and that the tool carrying bar 51 is fed downwardly from the position shown in Fig. 1 (i. e., the upper limit of movement allowed by the adjustment of the collar 95) to a lowermost position in which the collar 92 operates the unlatching plunger 90 to unclutch the downward power feed of the bar 51.

In this operation of the machine, it is assumed that the tools on the carrier 101, are desired to move transversely of the work while the tool or tools of the carrier 50 move in a direction parallel to the axis of rotation of the work. One of the important features of this invention is exemplified in the illustrative cooperation of these two tool carriers by which the downward movement of the carrier 50 is enabled to regulate or control or actuate the transverse movement of the tools on the carrier 101.

Figure 8:
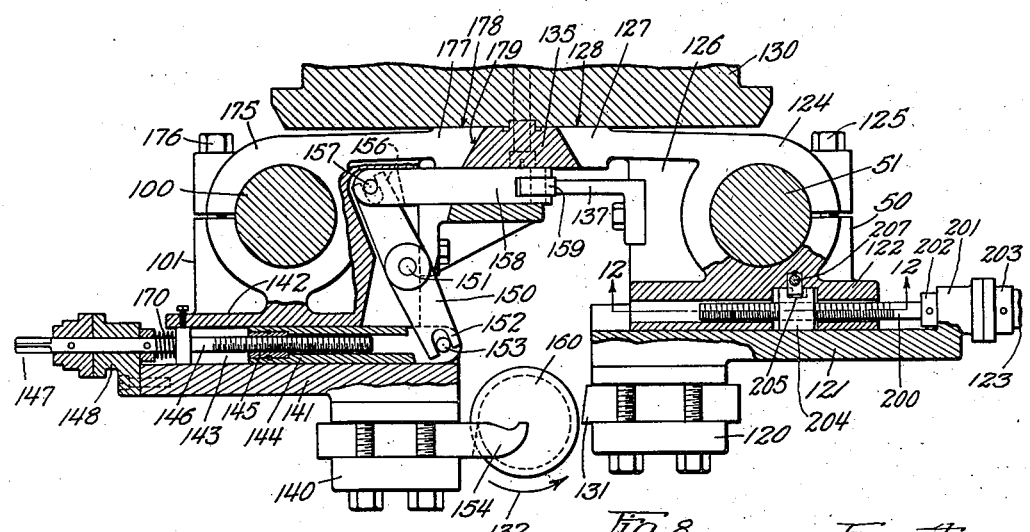
Fig. 8 is a horizontal section on the plane indicated by the lines 8—8 in Figs. 1, 2, 3 and 4.

These tool carriers are shown in front elevation in Fig. 1 and on an enlarged scale in Figs. 9, 10, and 11; and are shown in plan view, partly in section, in Fig. 8. They are also shown, the carrier 50 in side elevation in Fig. 3, and the carrier 101 in side elevation in Fig. 4.

Referring to the carrier 50, it comprises a tool clamping plate 120 of any suitable character mounted on a slide 121, dove-tailed to the base 122 of the carrier. The slide 121, is movable horizontally to adjust the tool toward and from the work in any suitable manner as by means of a hand-wheel 123.

As shown in Fig. 8, the base 122 of the tool carrier is provided with an integral sleeve 124 encircling the tool carrying bar 51 and that sleeve may be slit and provided with a tightening screw 125. The base 122 is also strongly webbed as at 126 to render the base as a whole stable and stiff, and projecting from the casting for the base 122 is an abutment 127 which rests and slides vertically against a smooth track 128 provided on the main frame standard 130 (Fig. 2) of the machine. This frame standard 130 being absolutely rigid and solid, supplies a rigid support for the abutment 127 against which the abutment rests under the working thrust of the tool and its carrier.

As shown in Fig. 8, the abutment 127 with a substantial area of bearing against the track 128 is located in a direct line with the thrust of the work 160 against the tool 131 as the work rotates in the direction of the arrow 132. In the specific construction a plane, tangent to the cylindrical work at the point of application of the tool 131, passes through the bearing area of the abutment 127 against the track 128. Consequently there is a direct transmission of the thrust on the tool to a solid and rigid support by the abutment 127 and the track 128, through the rigid tool carrier. The track 128 extends vertically through the path of travel of the tool carrier 50; and the abutment 127 has a vertical width, substantially equal to the entire vertical width of the tool carrier, so that the bearing area of the abutment 127 against the track 128 is very considerable and affords a durable and rigid means of sustaining the working thrust of the tool.

A bar 135 having the cross-sectional shape shown in Fig. 8, partly overlies the abutment 127 and assists in holding it in proper relation to the track 128. Bolted to the casting of the tool carrier base 122 is a cam plate 137 which may govern the operation of the tools on the other tool carrier as presently described.

The second tool carrier 101 which is mounted on the bar 100 has a tool clamping plate 140 bolted to a slide 141 which is dovetailed to the base 142 of the tool carrier. In the base 142, and extending horizontally therethrough, is a slideway 143 which receives a sliding plunger 144. The plunger 144 contains a nut 145 which receives a screw 146 provided with a squared extension 147 to receive a hand-wheel, the screw being journaled in a block 148, bolted to the tool carrying slide 141. When the sliding plunger 144 is held stationary the turning of the hand-wheel 147 will adjust the tool carrying slide 141 horizontally toward and from the work; and similarly, when such adjustment has been made, the sliding plunger 144 may be slid endwise in the slideway 143 to move through the screw 146, the slide 141 toward and from and into desired relation with the work. For so moving the sliding plunger 144, a lever 150 is provided pivoted at 151 on the main casting of the tool carrier, the forked end 152 of the lever 150 engaging a pin 153 fixed in the end of the sliding plunger 144. Referring to Fig. 8, rocking the lever 150 in a clockwise direction will move the tool slide 141 and the tool 154 horizontally away from the work. As shown in Fig. 8, the lever 150 stands at the limit of its contra-clockwise movement and the tool stands at the corresponding limit of its movement toward the right.

The end of the lever 150 opposite the pin 153 is also forked at 156 and engages a pin 157 in a second slide 158 located in a slideway in the main casting of the tool carrier; and at the right hand end of the slide 158 (Fig. 8) is a roller 159 arranged to cooperate with the cam plate 137 which is on the other tool carrier 50. Obviously the relative motion of the tool carrier 50 and of the tool carrier 101 may be such that the cam 137, acting on the roller 159, will cause the slide 158 to move inwardly in any desired manner according to the pattern of the cam so as to cause a corresponding progressive cutting action into the work by the tool or tools mounted under the clamping plate 140.

One illustrative manner of cooperation between the carriers for the purpose just suggested is indicated in Figs. 9, 10, and 11, wherein it is assumed that a casting for an explosive engine piston is about to be operated on. The piston casting is shown at 160, secured in any suitable manner to the spindle 20. It is assumed that the casting 160 is to be turned to desired cylindrical form and diameter by the tool 131 on the tool carrier 50; that the upper end of the piston is to be finished by a tool 154, on the tool carrier 101; and that two grooves are to be formed in the piston by the tools 162 and 163, respectively, also mounted on the tool carrier 101. To suit these purposes, the several tools occupy the positions shown in Fig. 9 preparatory to the beginning of the cutting operation; and during the cutting the tool carrying bar 51 is moved downwardly from the position shown until the tool 131 shall have traversed and finished the entire vertical length of the casting 160. At different stages of this vertical movement of the tool 131, it is desired that the tools 154, 162, and 163, on the other tool carrier, perform their operations. The tool actuating roller 159 is shown in Fig. 9 at the extreme of its outward movement with its slide 158, i. e., at the right hand extremity of its movement in Fig. 9. If the roller 159 and its slide 158 be forced toward the left in Fig. 9, or inwardly, at the proper times, the tools 154, 162, and 163, will be moved toward, and will be caused to perform their proper cutting operation on, the casting 160. To produce this desired inward movement of the roller 159 and its slide 158, the cam 137 is given the shape shown in Fig. 9. As there indicated the roller 159 is in its preliminary contact with the lowermost portion of the cam 137. From that point upwardly to a point 165, the cam has an oblique path so that in the downward movement of the tool carrier 50 said cam will force the slide 158 to the left, and the tool 154 toward the right so as to cut progressively from the periphery of the circular top surface of the casting 162 toward the center thereof, as indicated by the change in relation of the tool 154 and the casting 160 from the position shown in Fig. 9 to that shown in Fig. 10. By the time the downward movement of the tool carrier 50 brings the tool 131 into the position shown in Fig. 10, the upper portion of the casting 160 will have been finished throughout that cylindrical area upon which the tools 162 and 163 are intended to operate and therefore when the point 165 of the cam 137 reaches the roller 159, the further downward progression of the cam will move the tools 162 and 163 into their cutting operation on the piston casting 160. Because the tools 162 and 163 are cutting directly into and grooving the casting 160, it may be desired that their feeding movement during the cutting be slower than was the movement of the tool 154 during its operation of finishing the top surface of the piston. Therefore the cam 137 may have a less abrupt rise from the point 165 to the point 167 as shown on the drawings so that that rise between said points will move the roller 159 and its slide 158 inwardly less rapidly and at only such speed as is appropriate to the character of the cutting operation performed by the tools 162 and 163.

The termination of the cutting operations on the casting 160 finds the parts in the positions shown in Fig. 11 wherein the roller 159 has reached the idle dwell 169 of the cam 137. At this point the collar 92 on the tool carrying bar 51 will have reached a position to depress the shipping plunger 90 to unship the latch 83 (Fig. 1) and thereby unclutch the feeding pinion from its driving shaft whereupon the bar 51 will be returned upwardly by its counter-weight until the collar 95 contacts with the stop-face 96 (Fig. 9). When the cam 137 is thus withdrawn upwardly with the tool carrier, it leaves the slide 158 free to be moved outwardly, thereby permitting the tools 154, 162, and 163, to be retracted from the work by the spring 170 (Fig. 8) preparatory to another cutting operation.

It will be evident to those skilled in the art that the pattern of the cam 137 may be varied at will to suit any desired cooperative relation between the relative movement of one tool carrier and the other, the foregoing description serving to exemplify merely one species of such cooperation.

After a cutting operation has been completed as indicated in Fig. 11, it may be desired to withdraw the tool 131 slightly so that it will not contact with the work during its return upward movement. The present illustrative machine has means for thus withdrawing tool 131.

Referring to Fig. 8 the tool carrier 121 is provided with a screw 200 mounted in a bracket 201 on the slide 121 and confined by collars 202 and 203 against endwise movement in that bracket. The screw 200 threads into a block 204 which is mounted in the base 122 of the tool carrier. The tool carrier base 122 receives the block 204 in a slideway (see Fig. 8) which permits a limited movement of the block 204 in a direction lengthwise of the screw 200. When said block stands near the lefthand limit of its movement in Fig. 8, the tool 131 then stands in operative position relative to the work; and when the block 204 is moved toward the right hand limit of its movement in the slideway, the tool is withdrawn far enough from the work to prevent its contact with the work when the tool carrier is moved upwardly after a cutting operation. It is preferred that the tool be thus withdrawn by moving the block 204 toward the right in Fig. 8, by automatic means arranged to operate at some time between the completion of a downward cutting movement of the tool carrier and that stage in its upward movement at which the tool might contact with the work.

To suit these purposes the block 204 is provided (see Fig. 12) with a cam slot 205 which receives a lug 206 fixed upon a vertically movable rod 207, the rod 207 being slidably mounted in a vertical bore in the tool carrier base 122. The relation of the cam slot 205 and the lug 206 is such that when the rod 207 is moved downwardly in relation to the block 204 the latter is cammed to the left in Figs. 8 and 12, and when the rod 207 is moved upwardly in relation to the block 204 the latter is cammed to the right in Figs. 8 and 12, to withdraw the tool relatively to the work. To provide for automatically operating the rod 207 in the manner just suggested, said rod 207 (Fig. 2) is extended upwardly through an ear 208 projecting from the main frame casting, and above said ear 208 the rod 207 carries an adjustable collar 209, while below said ear 208 the rod carries a second adjustable collar 210. During the downward movement of the tool carrying bar 51 and the tool carrier 50, the rod 207 travels with the tool carrier base 122 until the upper collar 209 strikes the stationary ear 208 whereupon the downward movement of the rod 207 and its cam operating lug 206 is arrested. The adjustment of the collar 209 is such that it arrests the downward movement of the rod 207 after the cutting operation by the tool has been completed and at such a point that a slight further downward movement of the tool carrier base 122 and block 204 will cause the block 204 to be cammed toward the right in Figs. 8 and 12, with the result that the parts stand in the positions shown in Fig. 12 with the block 204 positioned near the right hand extremity of its movement. This operation having automatically withdrawn the tool from danger of contact with the work, the ensuing upward movement of the bar 51 and tool carrier 50 moves the rod 207 upwardly, while the parts remain in the positions shown in Fig. 12, until the lower collar 210 on the rod 207 contacts with the stationary ear 208, thereby arresting the upward movement of the rod 207. After the rod 207 thus comes to rest, a further upward movement of the tool carrier base 122 and block 204 causes said block 204 to be cammed toward the left in Figs. 8 and 12 to return the tool to its previous cutting position. Thereafter the tool may be adjusted to a new cutting position by appropriately rotating the screw 200 by the hand wheel 123 shown in Figs. 1 and 8. In the specific machine the collars 209 and 210 are so adjusted that the described tool withdrawing operation occurs just before the tool carrying bar 51 reaches the limit of its downward movement, and the tool is returned to its previous cutting position just before the tool carrying bar 51 reaches the limit of its upward return movement. With the described arrangement, the machine has not only the capacity for automatically reversing the movement of the tool carrier 51 and returning it to position for new cutting operation but has also the capacity to withdraw the tool from danger of contact with the work during the return movement.

Referring again to Fig. 8, the base 142 of the tool carrier 101 is shown as having an integral sleeve 175 which encircles the bar 100 and which may be slit and provided with a tightening screw 176. An extension 177, from the sleeve 175, bears against a track 178 on the main upright casting of the machine and also has an angular face 179 which engages beneath an angular face of the block 135. This engagement of the face 179 with the block 135 serves to hold the extension 177 and the entire tool carrier 101 securely against the main upright casting 130 and that engagement is in substantially direct line with the working thrust of the tool as it operates on the work rotated in the direction shown by the arrow 132 in Fig. 8.

Referring to Fig. 1, the belt pulley 46 may be provided with any suitable means for clutching it and unclutching it from the main shaft 45. For example an expansion clutch (see dotted lines, Fig. 4) may be provided in the pulley 46 to be operated by a shipping handle 180.

In the operation of the machine, the work—for instance the illustrative piston blank shown in Figs. 9, 10, and 11—is secured to the spindle 20; the tool carrying bars 51 and 100 and their carriers are placed in proper adjustment, as will be understood by those skilled in the art, the machine is started and the feeding clutch for the tool carrying bar 51 is thrown in by means of the shipping lever 89. Thereupon the downward cutting movement of the tool on the carrier 50 begins and during the course of that movement the cam 137 governs the cutting operation of the tools on the carrier 101. This cooperation between the tools is highly desirable in that thereby the tools may be relatively timed, automatically, with a precise accuracy and without any reliance upon the attention of the operator during the cutting. Once the machine has been started, its operation will continue, the cutting by both tools or sets of tools will proceed to completion, and thereupon the cutting will cease, the tools will be withdrawn from danger of injuring the work, and the tool carrier 51 will be returned automatically to its starting position.

The foregoing description explains only a single illustrative embodiment of the invention as used in one illustrative manner. As will be evident to those skilled in the art, the specific machine may be variously modified, and the various features of the invention may be embodied in various different constructions and organizations. It is not necessary that all the features of the invention be used conjointly since some of them may be used to advantage separately.

Claims.

1. A machine of the character described comprising, in combination, a lathe spindle disposed substantially vertically; a fixed substantially horizontal bearing supporting the weight of said spindle and the work and sustaining them against end thrust, and fixed substantially vertical bearings for said spindle—all said bearings being mounted and stiffly braced in frame members; a slidable tool carrying bar substantially vertically disposed; extensive bearings for said tool carrying bar permitting substantially vertical movement of said bar while holding it securely against transverse wear, there being extensive lengths of said bar in said bearings at all times; the respective mountings of said spindle and bar holding their respective axes in fixed relationship and substantially parallel to the direction of gravity; means for vertically moving said bar; and a tool carrier mounted on said bar, and means for relieving said bar from thrust of the work of the tool.

2. A machine of the character described comprising, in combination, a lathe spindle and means for rotating it; a tool carrier; and a rigid support for the tool carrier located substantially in a plane tangent to the work at the acting point of the tool.

3. A machine of the character described comprising, in combination, a lathe spindle and means for rotating it; a tool carrying bar movable endwise in a direction substantially parallel to the axis of rotation of the spindle; a tool carrier on said bar; an abutment on said tool carrier located substantially in a plane tangent to the work at the point of the tool; and a rigid track to support said abutment during the endwise travel of said bar.

4. A machine of the character described comprising, in combination, a lathe spindle disposed substantially vertically; a tool carrying bar movable substantially vertically to feed a tool in relation to the work, said bar having extensive bearings to support the bar with its axis of movement in fixed relationship to the axis of rotation of the spindle; a tool carrier on said bar and having an abutment substantially in a plane tangent to the work at the point of the tool; and a rigid track for said abutment, said abutment and said track having extensive cooperating bearing areas.

5. A machine of the character described comprising, in combination, a lathe spindle disposed substantially vertically and having substantially vertical bearings and a horizontal bearing whereby the tendency of gravity to cause unsymmetrical wear of said bearings is rendered substantially negligible; and a plurality of tool carriers so located in relation to the spindle as to present tools to the work in oposition to each other whereby the working thrusts of the respective tools tend to compensate and minimize unsymmetrical wear of the spindle on its bearings; vertically disposed carrier bars for said tool carriers having extended vertical bearings; means for relieving said bars from thrust of the work on the tool; and means to rotate the spindle.

6. In a machine of the class described, the combination of a lathe spindle; a tool carrier movable longitudinally of the axis of the work; a stationary tool carrier having a slide and tool carried thereby, said slide and tool movable transversely of the axis of the work; a cam carried by said longitudinally movable tool carrier; and means for moving said slide on said stationary tool carrier actuated through said cam by the movement of the longitudinally moving tool carrier.

7. In a machine of the class described, the combination of a lathe spindle; a tool carrier movable longitudinally of the axis of the spindle; a tool carrier having a slide movable transversely of said axis; a tool carried by said slide; adjusting means associated with said slide; and operating means carried by said last mentioned tool carrier and worked from said longitudinally movable tool carrier for moving said slide through said adjusting means.

8. A machine of the class described comprising, in combination, a vertical lathe spindle having vertical and horizontal bearings; vertical carrier bars having extended vertical bearings; tool carriers mounted on said bars so located in relation to the spindle as to present tools to the work in opposition to each other; means for moving one said bar vertically to feed the corresponding tool carrier longitudinally of the axis of the spindle; the opposite tool carrier having a transversely movable tool slide; and operating means carried by said opposite tool carrier and controlled from the longitudinally movable tool carrier for feeding said tool slide.

9. A machine of the class described comprising, in combination, a vertical lathe spindle having vertical and horizontal bearings; vertical carrier bars having extended vertical bearings; tool carriers mounted on said bars so located in relation to the spindle as to present tools to the work in opposition to each other; means for moving one said bar vertically to feed the corresponding tool carrier longitudinally of the axis of the spindle; the opposite tool carrier having a transversely movable tool slide; and operating means carried by said opposite tool carrier and controlled from the longitudinally movable tool carrier for feeding said tool slide; automatic means for reversing the movement of the bar carrying said longitudinally movable tool carrier; and automatic means for retracting the cutting tools during such reversal.

10. In a machine of the class described, the combination of the lathe spindle, tool carriers 50 and 101, slide 141, cam 137 and operating devices 158 and 150 for moving said slide by the movement of the tool carrier 50.

11. In a machine of the class described, the combination of the lathe spindle, tool carriers 50 and 101, slide 141, plunger 144, adjusting screw 146, and means connected with said plunger for moving said slide, said means controlled by movement of the tool carrier 50.

12. A machine of the character described comprising, in combination, a lathe spindle; a tool carrier having a tool supporting slide; and operating means on said carrier including a lever for moving said slide; and a second tool carrier having means for directly actuating said operating means.

13. A machine of the character described comprising, in combination, a lathe spindle; a pair of tool carrying bars; a tool carrier on each said bar; means supporting said bars substantially parallel to the spindle; means for moving one bar endwise; actuating means for moving a tool transversely of the other bar; and means for governing said actuating means by said endwise movement of the other bar.

14. A machine of the character described comprising, in combination, a lathe spindle disposed substantially vertically; a slidable counterweighted tool carrying bar disposed substantially parallel to the spindle; vertical bearings for said bar; a tool carrier on said bar; and means comprising a rack on said bar and cooperating pinion for moving said bar substantially vertically.

15. A machine of the character described comprising, in combination, a lathe spindle disposed substantially vertically; a slidable counterweighted tool carrying bar disposed substantially vertically; a tool carrier on said bar; means comprising a rack on said bar and cooperating pinion for moving said bar endwise; and means for automatically freeing said pinion to permit reverse endwise movement of said bar by its counterweight.

16. A machine of the character described comprising, in combination, a lathe spindle disposed substantially vertically; a tool carrying bar disposed substantially vertically; a tool carrier on said bar; power means for moving said bar endwise in one direction; means for automatically unclutching said power means to permit reversing the movement of said bar at a predetermined point; and independent means for reversing the movement of the bar.

17. A machine of the character described comprising, in combination, a lathe spindle; and a driving mechanism therefor including a driving shaft and a driven shaft, a sector mounted on one of said shafts, an intermediate gear mounted on said sector, a driving gear on one of said shafts and a driven gear on the other, and means for adjusting said sector on its shaft to mesh the intermediate gear with gears of different sizes on the other shaft; a tool-carrying bar parallel with the spindle; and means driven from said spindle for feeding said tool carrying bar.

18. A machine of the character described comprising, in combination, a lathe spindle disposed substantially vertically; a tool carrying bar disposed substantially vertically and having bearings disposed substantially vertically; a power shaft having means for moving said bar in its bearings; and means for automatically disconnecting said bar from said power shaft at a predetermined time.

19. A machine of the character described comprising, in combination, a spindle disposed substantially vertically; a tool carrying bar mounted for endwise movement in substantially vertical bearings; a counter weight tending to move said bar upwardly; power means for moving said bar downwardly; and automatic means for disconnecting said bar from said power means at a predetermined time.

20. A machine of the character described comprising, in combination, a lathe spindle disposed substantially vertically; a tool carrying bar mounted for movement in substantially vertical bearings; power means for moving said bar endwise in one direction; automatic means for disconnecting said bar from said power means at a predetermined time; and means for moving said bar endwise in the opposite direction when so disconnected from the said power means.

21. A machine of the character described comprising, in combination, a lathe spindle disposed substantially vertically; a pair of tool carrying bars disposed substantially vertically, one said bar being held stationary and the other said bar being movable endwise; tool carriers mounted on said bars; means for moving a tool on said stationary bar horizontally; and connections with said movable bar for governing the horizontal movement of said tool.

22. A machine of the character described comprising, in combination, a lathe spindle disposed substantially vertically; a pair of tool carrying bars disposed substantially vertically, one said bar being held stationary and the other being movable endwise; means supporting a tool for horizontal movement on said stationary bar; and connections to the endwise movable bar for causing horizontal movement of said tool.

23. A machine of the character described comprising, in combination, a lathe spindle disposed substantially vertically; a pair of tool carrying bars; tool carriers on said bars; and means for rigidly supporting said carriers substantially in planes tangent to the work at the points of their respective tools.

24. A machine of the character described comprising, in combination, a lathe spindle disposed substantially vertically; a pair of tool carrying bars disposed substantially vertically, one said bar being held stationary and the other being movable endwise; tool carriers fixed on the respective bars; and means for rigidly supporting said tool carriers substantially in planes tangent with the work at the points of their respective tools.

25. A machine of the character described comprising, in combination, a lathe spindle disposed substantially vertically; a tool carrying bar disposed substantially vertically; a tool carrier on said bar; means for moving said bar endwise in one direction; means for automatically reversing the movement of said bar at a predetermined point; and means for automatically withdrawing the tool to avoid injury to the work during said reversing movement.

26. A machine of the class described comprising, in combination, a vertical lathe spindle and tool-carrying bar, said bar slidable in vertical bearings; operating mechanism including bevel gears for driving said spindle; and mechanism for operating said bar from said spindle, including additional bevel gears, a worm and worm-wheel and clutch-controlled means for operative connection with said bar.

27. A machine of the class described comprising, in combination, a vertical lathe spindle and tool-carrying bar, said bar slidable in vertical bearings; driving mechanism for said spindle; mechanism for moving said bar including a clutch-controlled gear and shaft, a pinion on said shaft and a rack on said bar; and hand-operated means for operating said shaft when unclutched from said gear to permit adjusting said bar.

28. A machine of the class described comprising, in combination, a vertical lathe spindle and tool carrying bar, said bar slidable in vertical bearings; driving mechanism for said spindle; power means for moving said bar including a clutch-controlled pinion and rack on said bar engaged by said pinion; means for automatically unclutching said pinion at a predetermined point in the movement of said bar; and means for automatically reversing the movement of said bar.

29. A machine of the class described comprising, in combination, a vertical lathe spindle and tool-carrying bar, said bar slidable in vertical bearings; power means for moving said bar downward; means for automatically disconnecting said bar from said power means at a predetermined point in its movement; and a counterweight for quickly lifting said bar.

30. A machine of the class described comprising, in combination, a vertical lathe spindle and tool-carrying bar, said bar slidable in vertical bearings; power means for moving said bar downward; means controlled by said bar for automatically disconnecting said bar from said power means; a counterweight for lifting said bar; and means for automatically withdrawing the tool to avoid injury to the work during the lifting of the bar.

31. The combination with a vertical lathe spindle, vertically slidable tool-carrying bar, and means for moving and automatically reversing the movement of said bar, of a tool-carrier mounted on said bar having the screw-adjusted tool slide and movable block 204, the vertically movable rod 207, and stops for said rod, said rod and block cooperating to withdraw and protract the tool at predetermined points in the movement and reverse movement of said bar.

32. A machine of the class described comprising, in combination, a vertical lathe spindle and tool-carrying bar, said bar slidable in vertical bearings; driving mechanism for said spindle including a removable gear and provision for adjusting the remainder of said mechanism to suit different sizes of removable gears; and mechanism driven from said spindle, including intermeshing gears 60, 70, adapted to be replaced by gears of different sizes, for moving said bar.

33. The combination of a vertical lathe spindle; a pair of vertically-slidable tool-carrying bars; power means including a horizontal shaft; loose pinions thereon; racks on said bars engaged by said pinions; and clutches for said pinions; whereby said power means may be operatively connected with either of said bars.

34. The combination of a vertical lathe spindle; a pair of vertically-slidable tool-carrying bars; power means including a clutch-controlled horizontal shaft; clutch-controlled pinions on said shaft; racks on said bars engaged by said pinions; and independent hand-operated means for turning said shaft.

35. The combination of a vertical spindle; vertically-slidable tool-carrying bar; clutch-controlled means for moving said bar; a clutch latch; means operated by said bar for releasing said latch; and a counterweight for raising said bar.

36. The combination with the vertically disposed spindle, slidable tool-carrying bar and vertical bearings for said spindle and bar, of a tool-carrier abutment 127, the rigid track 128 and bar 139.

In testimony whereof, we have signed our names to this specification.

PERCY M. FOWL.
HERMAN W. ZIMMERMAN.